(12) United States Patent
Knoop et al.

(10) Patent No.: US 9,221,127 B2
(45) Date of Patent: Dec. 29, 2015

(54) METHOD FOR PRODUCING WELDED TUBES FROM STEEL

(71) Applicant: EUROPIPE GMBH, Mülheim (DE)

(72) Inventors: Franz Martin Knoop, Vienenburg (DE); Michael Kaack, Bochum (DE); Ludwig Oesterlein, Mülheim (DE)

(73) Assignee: EUROPIPE GMBH, Mülheim (DE)

( * ) Notice: Subject to any disclaimer, the term of this patent is extended or adjusted under 35 U.S.C. 154(b) by 0 days.

(21) Appl. No.: 14/386,467

(22) PCT Filed: Feb. 27, 2013

(86) PCT No.: PCT/DE2013/000130
§ 371 (c)(1),
(2) Date: Sep. 19, 2014

(87) PCT Pub. No.: WO2013/139321
PCT Pub. Date: Sep. 26, 2013

(65) Prior Publication Data
US 2015/0048146 A1 Feb. 19, 2015

(30) Foreign Application Priority Data
Mar. 22, 2012 (DE) .......................... 10 2012 006 472

(51) Int. Cl.
*B23K 31/00* (2006.01)
*B23K 31/12* (2006.01)
(Continued)

(52) U.S. Cl.
CPC ................. *B23K 31/12* (2013.01); *B21C 37/08* (2013.01); *B21C 37/083* (2013.01);
(Continued)

(58) Field of Classification Search
CPC .......... G01N 29/07; G01N 2291/0421; G01N 2291/0422; G01N 2291/044; G01N 22/00; G01N 23/00; G01N 23/06; G01N 27/9033; B23K 31/12; B23K 2201/06; B23K 31/125; B21C 51/00

USPC ....................... 228/103, 104, 110.1
See application file for complete search history.

(56) References Cited

U.S. PATENT DOCUMENTS

2005/0035094 A1  2/2005  Titze et al.
2007/0006651 A1*  1/2007  Kruger et al. ................... 73/579
(Continued)

FOREIGN PATENT DOCUMENTS

DE  31 37 858 C1  7/1983
DE  103 31 000 B3  10/2004
GB  2 027 373 A  2/1980
JP  H11 333516 A  12/1999

OTHER PUBLICATIONS

International Search Report issued by the European Patent Office in International Application PCT/DE2013/000130.

*Primary Examiner* — Erin Saad
(74) *Attorney, Agent, or Firm* — Henry M. Feiereisen LLC

(57) ABSTRACT

In a method for producing welded pipes from steel, in which strips or metal sheets are formed into a pipe provided with a longitudinal or helical slot and the abutting edges of the slotted pipe are welded together, the process parameters for production of the pipes are specified on the basis of previously ascertained material properties and geometry of the strips or metal sheets. Before the forming process, the strip or metal sheet is subjected to an nondestructive, continuous or discontinuous test for inhomogeneities over the length and width, an integral characteristic value for the material property of the strip or metal sheet is formed from the measured values, a measure of the homogeneity of the material properties relating to the length and width of the strip or metal sheet is derived from the variance in the measured values for the various measurement points and, in the event of deviations in the measured values exceeding previously specified limit values, the process parameters are reset and/or the strip or metal sheet is subjected to a homogenisation process prior to the forming process.

11 Claims, 2 Drawing Sheets

(51) Int. Cl.
*B21C 37/083* (2006.01)
*B21C 37/12* (2006.01)
*B21C 51/00* (2006.01)
*B21C 37/08* (2006.01)
*B23K 31/02* (2006.01)

(52) U.S. Cl.
CPC ............ *B21C 37/122* (2013.01); *B21C 37/126* (2013.01); *B21C 51/00* (2013.01); *B23K 31/027* (2013.01); *B23K 2201/06* (2013.01)

(56) References Cited

U.S. PATENT DOCUMENTS

| | | | |
|---|---|---|---|
| 2010/0091812 A1* | 4/2010 | Louban et al. | 374/4 |
| 2010/0219818 A1 | 9/2010 | Kaack et al. | |
| 2012/0098532 A1 | 4/2012 | Kaack et al. | |
| 2012/0261387 A1 | 10/2012 | Holste et al. | |
| 2012/0318064 A1 | 12/2012 | Kaack et al. | |
| 2014/0365158 A1* | 12/2014 | Dubois et al. | 702/104 |

* cited by examiner

METHOD FOR PRODUCING WELDED TUBES FROM STEEL

CROSS-REFERENCES TO RELATED APPLICATIONS

This application is the U.S. National Stage of International Application No. PCT/DE2013/000130, filed Feb. 27, 2013, which designated the United States and has been published as International Publication No. WO 2013/139321 and which claims the priority of German Patent Application, Serial No. 10 2012 006 472.1, filed Mar. 22, 2012, pursuant to 35 U.S.C. 119(a)-(d).

BACKGROUND OF THE INVENTION

The invention relates to a method for producing welded tubes from steel

In the following welded tubes mean helical seam tubes, so called spiral welded tubes, as well as longitudinal seam welded tubes.

For transporting water, oil and gas usually submerged arc welding (UP), high frequency induction welded (HFI) or electric resistances welded (ERW) conducting tubes are used, which are preferably produced for hot strip or from plates in thicknesses of about 10 to more than 25 mm.

Helical seam tubes are usually UP welded, while longitudinally seam welded tubes beside UP welded can also be HFI or ERW welded. However increasingly laser or laser hybrid welding consisting of a combination of laser and protective gas welding, is also used for such tubes.

In the longitudinal seam welded large tubes, which are welded with the UP method, the method referred to in the art as UOE is the most commonly used method. In this method in a first step the edges of an even steel sheet are bent. The subsequent die forms the steel sheet with a round die into a U-shape (U-pressing tool), which is subsequently pressed on an O-pressing tool with two closing dies to a round open seam tube. Subsequent to the forming of the steel sheet onto an open seam tube the latter is finished welded in a second step by means of UP welding. Because in many cases the thus produced tubes after internal and external welding do not yet meet the requirements regarding diameter, roundness and straightness they are calibrated (expansion) by cold expansion. The thus produced tubes are provided with a coating depending on the demands on corrosion resistance and are welded to pipelines at the construction site and are for example used for the oil and gas transport.

For helical seam tubes it is known from the brochure "spirally welded large tubes—product information" (Salzgitter Mannesmann large tube 3/08), to align the hot strip after uncoiling from a coil, to form the hot strip helically to a open seam tube in a forming device, and after forming the strip is welded in a two step process to a tube.

For this the strip is formed in a forming unit or a tube forming machine to a tube. The forming unit consists of a 3 roller bar bending system with an outer roller support cage and a so-called offset roller. With the height adjustable offset roller a possible strip edge offset of the open seam tube can be compensated, In this manufacturing process which is known as HTS-method" (Helical Seam Two Step) the strip edges of the open seam tube are welded in a first step by means of protective gas tack welding at high welding speeds of up to 15 m/min, wherein the strip edges are only partially connected to each other.

The tube diameter is influenced by the feed angle of the strip into the forming unit and by the strip width of the used starting material. By means of the height adjustable offset roller the diameter of the rube can also be influenced.

The final welding with a complete welding oft the strip edges with an inner and outer seam occurs subsequently in a second step on separate welding stands by means of UP welding.

The advantage compared to the conventional one-step method in which also the submerged arc welded seams are directly produced in the tube forming machine and welding of the tube is thus completed in one step, are that the high speed of the tack welding achieves a higher performance of the tube forming machine.

After the welding, the spiral welded tubes are subjected to a water pressure test for testing tightness, and are subsequently tested in multiple stations whether they meet the quality standards and are then prepared for shipping.

Depending on the demands on the corrosion resistance the longitudinally or spiral welded tubes can also be provided with a coating.

In particular under conditions in which pipelines are installed offshore and are subjected to very high external pressure, the tubes have to meet ever increasing demands regarding the roundness tolerances due to the increasing demands on for example collapse resistance. However, not only the geometry (roundness, straightness) but also the material properties such as strength, tenacity etc., significantly influence the performance characteristics of the tubes.

There is a demand for a high constancy of the tube properties regarding geometry and material and also the tube cross-section and length of a tube as well as between tubes compared to each other. The uniformity of these demanded properties is influenced by many factors during the entire production process.

These factors are on one hand the material properties of the starting material (strip or metal sheet) such as for example strength, tenacity microstructure, texture, internal tension sate etc., which are to be as uniform and homogenous as possible along the length and width. On the other hand these factors also involve the constancy of the selected process parameters for example during forming and in the subsequent manufacturing steps.

From GB 2 027 373 A it is known that the inherent stress condition of the strip has an influence in the uniformity of the tube geometry (ovality, straightness etc.). Determination of the inherent stress condition by itself however is not sufficient to characterize the quality of the finished tube because the further influencing factors remain unaccounted for.

Within the scope of the quality control therefore many integrated destructive and different nondestructive tests are carried out in the manufacturing process of the welded tubes to ensure the qualitative demands on the finished tube.

The quality-ensuring measures are comparable in longitudinally or helical seam welded tubes.

The material characteristic values of the starting material, i.e., the strip or metal sheet material, are usually determined by random sampling by means of destructive testing methods such as for example pull test or notch impact test and beside the geometric values (length width thickness) are taken into account for adjusting eh manufacturing parameters such as for example forming of the strip or metal sheet, welding parameters or subsequent alignment processes.

It is for example known that the mechanical material properties or the inherent stress condition due to different cooling conditions during rolling of the strips and metal sheets can vary over their width and length. When the properties of the strip or metal sheet are known the process parameters can correspondingly be adjusted.

With the known methods of the destructive material testing, however only a local and random testing and control of the strip and metal sheet properties and with this only a limited assessment of the effect on a possible required adjustment of the process parameters and with this on the properties of the component is possible.

A complete characterization of the material properties by determining the mechanical characteristic values, tenacity, inherent stress condition, microstructure and texture over the length and width of the strip or the metal sheet and the formed tubes via a feed back to the manufacturing process can currently only be realized for individual metal sheets or strips with destructive testing methods and therefore only with great effort which is economically not feasible.

A complete testing and documentation of the metal sheet/strip quality regarding the material properties is therefore currently not undertaken.

No method is known date with which the material properties can economically be tested over the entire metal sheet or strip surface and with which the properties of the metal sheet/strip for example with regard to the forming behavior during forming of the metal sheet/strip to a open seam tube can be characterized.

SUMMARY OF THE INVENTION

Object of the invention is therefore to set forth a method for producing welded tubes from steel with which the material properties of the basic material (strip/metal sheet) can be easily and cost effectively characterized over the entire surface of the metal sheet or strip and with which the determined characteristic values can be used for controlling or regulating the process parameters.

This object is solved by a method for producing welded tubes from steel, including obtaining measuring values regarding material properties of a strip or metal sheet at different at measuring sites along a length and width of the strip or metal sheet by a nondestructive continuous or discontinuous testing; forming an integral characteristic value for the material properties of the strip or the metal sheet as a function of the obtained measuring; determining a degree of homogeneity of the material properties with regard to the length and width of the strip or metal sheet as a function of a variance of the measuring values at the different measuring sites; when a deviation of the measuring values exceeds a predetermined threshold, adjusting process parameters used for producing the welded tubes and/or subjecting the strip or metal sheet to a homogenization process; applying the adjusted process parameters during forming of the strip or metal sheet into a longitudinal or helical open seam tube and during welding of confronting edges of the longitudinal or helical open seam tube Advantageous refinements are the subject matter of the dependent claims.

According to the teaching of the invention a method for producing welded tubes from steel is proposed in which a strip or metal sheet is formed into a tube which is provided with a longitudinal or helical open seam and the abutting edges of the open seam tube are welded together, and wherein the process parameters for the tube production are determined on the basis of the predetermined material characteristic values and the geometry of the strips, wherein prior to the forming the strip/metal sheet is subjected over its length and width to a destruction free, continuous or discontinuous testing regarding inhomogeneities, an integral characteristic value for the material properties of the strip/metal sheet is formed from the measuring values and a degree of the homogeneity of the material properties is derived from the variance of the measuring values of the different measuring points and when exceeding predetermined thresholds for the deviation of the measurement value the process parameters are readjusted and/or the strip/metal sheet is subjected to a homogenization process prior to the forming.

A significant advantage compared to the known methods is a significantly improved, i.e., more comprehensive documentation of the material properties of metal sheets and strips during tube production, in addition the method according to the invention is significantly more cost effective compared to destructive testing methods. It is particularly advantageous when the nondestructive testing method is automated.

The material properties are no longer detected and analyzed via destructive testing by random sampling, but continuously or discontinuously and nondestructively (for example grid like or oscillating) over the entire surface of the strip or metal sheet, so that possible changes in the homogeneity of the material properties over the length and width of the strip or metal sheets can be directly responded to by corresponding adjustments in the process parameters.

Tests have shown that coarse changes in the material properties which may occur for example due to inadvertent or provoked errors in the production process of the strips or metal sheets, can clearly be detected in the measuring values. Corresponding starting material, which would strongly limit the utility value of the finished product can thus already be sorted out prior to the forming.

Advantageously the measuring values can be used to automatically control or even regulate the process parameters of the subsequent process steps in the case of smaller variations. The individual measuring values reflect integral characteristic values for the material properties, which characterize the mechanical properties (yield strength, tensile strength, elongation at break, tenacity etc.), inherent stress condition, material microstructure and texture.

It has been shown that for achieving most homogenous component properties the process parameters to be adjusted in the individual manufacturing steps, and here in particular the forming process of the strip or metal sheet, are significantly influenced by the uniformity and homogeneity of the starting material. For example, a change of strength values or inherent stresses over the strip width or strip length change has a direct influence on the forming processes during forming of the strip and with this on the geometry of the welded tube. An advantage of the disclosed method is that strength values as well as inherent stresses have a significant influence on the integral characteristic values so that possible inhomogeneities in the strength values and the inherent stresses can be recognized.

By means of nondestructive tests such as for example ultrasound or electromagnetic methods (for example eddy currents) according to the invention measurements are taken continuously or discontinuously (for example grid-like or oscillating) over the length and width of the strip/metal sheet and a degree of the homogeneity of the material properties is derived from the variance of the determined measuring values (measuring parameters).

In tests, in particular ultrasound testing has proven to be a very useful method for integral characterization of the material properties. Hereby, the change of the ultrasound runtimes is used as a measure to the homogeneity of the material properties.

For the testing, i.e., for impinging the metal sheet or strip with ultrasound, advantageously two independent ultrasound modes are used which act at the same measuring point, wherein the measured runtime values are put in relation to each other in order to exclude an influence of the metal sheet or strip thickness on the ultrasound run times. Useful for this purpose have proven transverse waves with different polarization directions.

In order to obtain detailed information regarding the type and distribution of the material properties or the inherent stress components, more than two ultrasound modes can also be used. When for example one longitudinal and two transverse modes are used, further wall thickness-independent variables can be determined, in that the measured values of the runtimes are put in relation to each other, which wall thickness independent variables are suited for characterizing the material properties.

From the physical relationship between runtime or runtime changes, resulting from the change of the speed of sound, a value can then be derived for the integral characteristic number of the metal sheet or strip properties at the respective measuring point of the testing bod, via the in relation set ultrasound runtimes between the different waves (for example by forming the relationship or the relative difference).

When the material properties (yield strength, tensile strength, elongation at break, tenacity, material microstructure, texture etc.) of the metal sheet or strip throughout its manufacturing process constantly then rests a possible variation of the integral characteristic number essentially on the variation of the inherent stresses. The greater the characteristic number the higher is the inherent stress level.

In an advantageous refinement of the invention, the ultrasound is introduced into the test specimen by electromagnetic excitation so that coupling means are not required.

The results of the nondestructive testing may however not only be used for adjusting or optimizing the process parameters during tube production but also to optimize the production parameters such as rolling and cooling parameters during the production of the metal sheet or strip and thus based on the feedback of the measuring results improve the homogeneity of the metal sheets/strips. As a result the quality of the tubes can be significantly improved without having to adjust the process parameters during tube production.

The possible application of this testing method for characterizing the homogeneity of the material properties however are not limited to the testing of the starting material for the tube production but are also suited advantageously for characterizing the homogeneity of the material properties of the tubes in the individual manufacturing steps.

The applications can be summarized as follows:
measuring of structure and mechanical physical properties
pulling test characteristic values (strength and ductility)
tenacity
inherent stress condition
microstructure and texture
on the tube body or on the strip or the metal sheet over its width and length as integral characteristic value
  continuous or random quality testing of the used strips or metal sheets regarding the uniformity and homogeneity of the above mentioned mechanical physical properties.
  continuous or random testing/monitoring of the uniformity/stability of the adjusted process parameters during the tube production across all production stages of metal sheet/ strip until coating of the tube
  continuous or random determination of properties prior to during or after the following process steps (individually or across process steps)
  1. coiling the strip
  2. aligning the hot strip or the metal sheet (alignment process)
  3. forming the tube (cold forming)
  4. welding the tube
  5. calibrating the tube or expanding the tube (cold forming)
  6. water pressure testing (relaxation)
  7. heating of the tube for coating the tube
  continuous or random quality testing and control of the produced tubes regarding the uniformity of microstructure and mechanical physical properties locally or over the entire tube body.
  recognizing tubes with insufficient mechanical properties
  adjusting tube production parameters for improving properties (raising the yield strength by increasing the cold deformation for example during the alignment process).

FIGS. 1 to 3 show several examples of surfaces of metal sheets, which were scanned by means of ultrasound over their length and width. Shown are the results of runtime measurements of the ultrasound signals, wherein the stated numbers in the scale adjacent the Figures represent the relative differences of the runtimes (difference by sum of the runtimes) in percent for the different polarization directions.

DETAILED DESCRIPTION OF PREFERRED EMBODIMENTS

Figure 1:
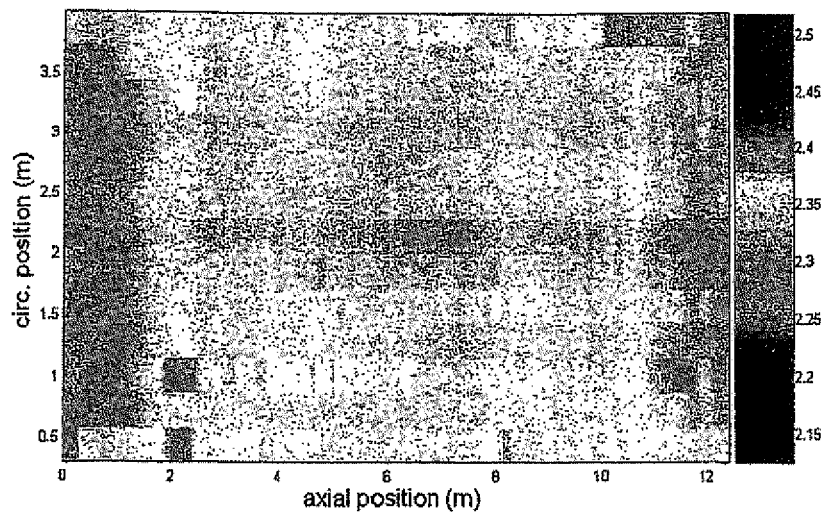
FIG.1- shows an example of a surface of a metal sheet scanned by means of ultrasound over its length and width.

As shown in FIG. 1, the measured relative run times of the ultrasound signals have a good symmetry in longitudinal as well as in width direction of the metal sheet so that approximately homogenously distributed material properties are given with regard to the symmetry axes. Because the stated values for the runtime differences between the two directions of polarization are relatively low, the subject metal sheet has a homogenous property distribution regarding the symmetry axes.

Figure 2:
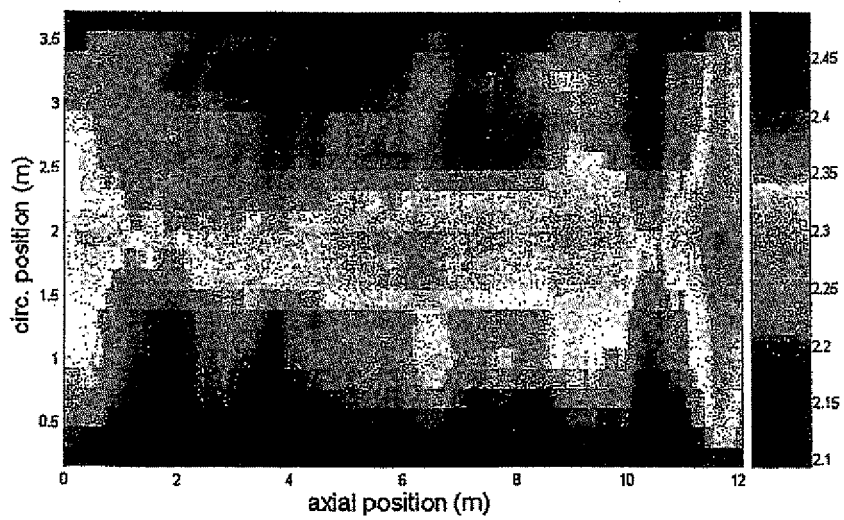
FIG.2- shows another example of a surface of a metal sheet scanned by means of ultrasound over its length and width.

FIG. 2 shows an example of a metal sheet that has a rather symmetrical property distribution over the sheet thickness, however having strong variations of property due to the high relative differences in the ultrasound runtimes, which have to be taken into account for the forming of the metal sheet. Due to the good symmetry this can be reacted to however usually well.

Figure 3:
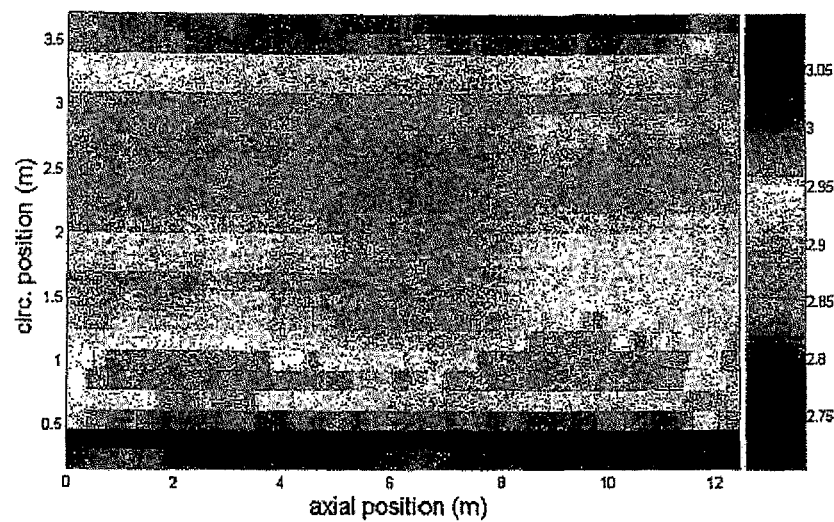
FIG.3- shows a further example of a surface of a metal sheet scanned by means of ultrasound over its length and width.

A metal sheet with a significant asymmetry of the properties over the sheet thickness is shown in FIG. 3. Without adjustment of the process parameters a tube produced from this metal sheet shows a significant oval shape after the forming and welding.

What is claimed is:

1. A method for producing welded tubes from steel, comprising:
   obtaining measuring values regarding material properties of a strip or metal sheet at different measuring sites along a length and width of the strip or metal sheet by a nondestructive continuous or discontinuous testing;
   forming an integral characteristic value for the material properties of the strip or the metal sheet as a function of the obtained measuring;
   determining a degree of homogeneity of the material properties with regard to the length and width of the strip or metal sheet as a function of a variance of the measuring values at the different measuring sites;

when a deviation of the measuring values exceeds a predetermined threshold, adjusting process parameters used for producing the welded tubes and/or subjecting the strip or metal sheet to a homogenization process;

applying the adjusted process parameters during forming of the strip or metal sheet into a longitudinal or helical open seam tube and during welding of confronting edges of the longitudinal or helical open seam tube.

2. The method of claim 1, wherein the nondestructive testing comprises introducing ultrasound into the strip or metal sheet and measuring a runtime of the ultrasound, said variance of the measuring values being commensurate with a difference in runtimes of the ultrasound.

3. The method of claim 2, wherein at least two independent ultrasound modes are used for the testing, said method further comprising correlating runtimes of the two independent ultrasound modes with each other to thereby eliminate an influence of a respective thickness of the or strip or metal sheet.

4. The method of claim 3, wherein transverse waves with different polarization direction are used as ultrasound modes.

5. The method of claim 3, wherein longitudinal waves and transverse waves are used as ultrasound modes.

6. The method of claim 1, wherein the homogenization process prior to the forming comprises a heat treatment and/or a mechanical alignment process.

7. The method of claim 1, wherein the deviations of the measurement values are used for an open loop or closed loop process control.

8. The method of claim 1, further comprising readjusting process parameters for at least one of forming the strip, welding of the open seam tube, and a calibration or alignment processes subsequent to the welding as a function of the deviation of the measurement values.

9. The method of claim 1, wherein the nondestructive testing is carried out in an automated manner.

10. The method of claim 1, wherein the material properties are determined on the tube during individual steps of producing the tube and are used for adjusting process parameters of process steps respectively subsequent to the individual steps.

11. The method of claim 1, wherein the characteristic integral value of the material property determined on the strip or the metal sheet is used for adjusting rolling parameters of subsequently rolled strips or metal sheets.

* * * * *